United States Patent [19]

Blount

[11] 3,960,747

[45] June 1, 1976

[54] PROCESS FOR THE PRODUCTION OF AN ACIDIC AQUEOUS SOLUTION OF SILICO-FORMIC ACID

[76] Inventor: David H. Blount, 5450 Lea St., San Diego, Calif. 92105

[22] Filed: June 10, 1974

[21] Appl. No.: 477,861

[52] U.S. Cl. .............................. 252/182; 252/313 S; 423/325; 423/331; 423/332; 106/288 B
[51] Int. Cl.$^2$ .................. C01B 33/12; C01B 33/18; C01B 33/00
[58] Field of Search .......................... 252/182, 313 S; 423/326, 325, 331, 332–336; 106/288 B

[56] References Cited
UNITED STATES PATENTS

| | | |
|---|---|---|
| 1,129,320 | 2/1915 | Vail et al. ............................ 423/326 |
| 3,473,890 | 10/1969 | Reinhardt et al. .................. 423/332 |

OTHER PUBLICATIONS

Iler, "The Colloid Chemistry of Silica and Silicates," Cornell University Press, 1955, p. 91.

Hackh's Chemical Dictionary, McGraw Hill, 1969, pp. 387, 610, 611.

*Primary Examiner*—Benjamin R. Padgett
*Assistant Examiner*—Irwin Gluck

[57] ABSTRACT

An acidic solution of silico-formic acid is obtained by adding a solution of silico-formic acid in a dilute alkali metal hydroxide solution or an alkali metal silico-formate solution slowly into an acid solution. The pH must remain below 5.

5 Claims, No Drawings

3,960,747

PROCESS FOR THE PRODUCTION OF AN ACIDIC AQUEOUS SOLUTION OF SILICO-FORMIC ACID

SUMMARY OF THE INVENTION

This invention relates to a process for the production of a solution of silico-formic acid in an acid solution. The silico-formic acid may be obtained by dehydration and neutralization of a dry alkali metal silicate with a concentrated mineral acid. Silico-formic acid may also be produced by other means.

The silico-formic acid is soluble in dilute alkali metal hydroxide, using a 10 percent sodium hydroxide solution, which is then heated to 50°–100° C. Silico-formic acid is added and goes into solution in 1–3 minutes. A 30 percent solution of silico-formic acid may be obtained by this method. The silico-formic acid is also soluble in alkali metal salts of weak acids having a pH of 10 or more.

Aqueous alkali metal hydroxide will react with silico-formic acid, using one mol of each, to form alkali metal silico-formate, which is soluble in an aqueous solution.

I have discovered that when an aqueous solution containing up to 10 percent alkali metal silico-formate or silico-formic acid in dilute alkali metal is slowly added to a mineral acid with the pH below 5 at 30°–75° C, the alkali metal silico-formate is neutralized, and the silico-formic acid goes into solution. If the pH goes above 5.5 the silico-formic acid will form a gel with strong thickening and thiotropy-causing properties. The particle size and surface area varies with the concentration of silico-formic acid in the solution. The gel may be filtered, washed and dried, producing finely-divided silico-formic acid. This finely divided silico-formic acid is soluble in dilute sodium hydroxide and the above process may be repeated.

Chemical reactions in this process are:

1. Silico-formic acid production

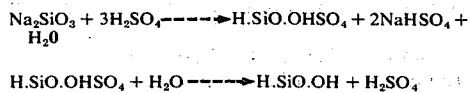

$$H.SiO.OHSO_4 + H_2O \longrightarrow H.SiO.OH + H_2SO_4$$

2. Sodium silico-formate production

3. Acidic solution of silico-formic acid production

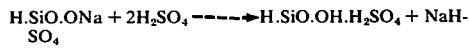

4. Finely-divided silico-formic acid production

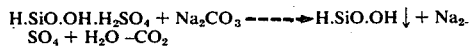

The acidic aqueous solution of silico-formic acid obtained in this process is very stable and will remain in solution for months. The concentration of silico-formic acid in a weak sodium hydroxide solution or an aqueous sodium silico-formate solution may be up to 10 percent when using 10–20 percent sulfuric acid. If the sulfuric acid concentration is above 20 percent, the 10 percent solution will slowly gel, even though the pH is below 4.5. A more concentrated sulfuric acid may be used if the sodium silico-formate concentration in the solution is less than 5 percent; the less concentrated the sodium silico-formate solution is, the greater the concentration of sulfuric acid may be used to produce an acidic aqueous solution of silico-formic acid.

The acidic solution of silico-formic acid may be used in the production of polyester resins, polyurethane resins, phenol resins, urea resins, furan resins, vinyl resins, styrene resins, polyether resins, natural rubber, acrylonitrile resins, as a thickening and thiotropic agent, and in catalyst formation.

The basic goal of the invention, therefore, is to provide a process for the production of an acidic aqueous solution of silico-formic acid by slowly adding a solution of sodium silico-formate to a mineral acid or an organic acid solution as acetic acid, keeping the pH below 5.

A further object is to provide a new and useful form of silico-formic acid. Still another object of the invention is to produce an acidic solution of silico-formic acid which can be used in the polymerization process of various plastics, elastomers and natural products, which are polymerized by an acid.

Another object is to produce a silico-formic solution in a mineral acid, which on neutralization or evaporation of the acid, forms a silico-formic acid gel with strong thickening and thiotropy-causing properties. The gel, when dried, forms a finely-divided silico-formic acid. On further heating of the finely-divided silico-formic acid, silicon dioxide is formed.

My invention will be illustrated in greater detail by the specific examples which follow, it being understood that these are merely illustrative of, and not limited to, procedures which may be used in the production of an acidic solution of silico-formic acid in accordance with this invention.

EXAMPLE I

One mol of silico-formic acid (H.SiO.OH), which was produced by neutralization and dehydration of dry sodium silicate, is mixed with one mol of sodium hydroxide and added to one liter of water, which is heated to 50°–75° C, while stirring. The mixture goes into solution in 1—3 minutes, forming a solution of sodium silico-formate (H.SiO.ONa).

The solution of sodium silico-formate containing one mol per liter is slowly added to 15 percent sulfuric acid, while stirring, keeping the temperature between 30°–75° C and keeping the pH below 5. The sodium silico-formate is neutralized, and the silico-formic acid remains in solution. The solution is very stable and does not gel or form a precipitate as long as the pH is below 5.

EXAMPLE II

One mol of silico-formic acid is mixed with one mol of sodium hydroxide (NaOH.3½H$_2$O) and heated to 50°–75° C for 1–3 minutes, and sodium silico-formate (H.SiO.ONa) is formed, a fine white powder.

The dry sodium formate is slowly added to a 5 percent sulfuric acid with stirring until the pH is 4.5. The sodium formate is neutralized, and silico-formic acid remains in solution. The temperature is kept between 30°–75° C. The solution is very stable and does not gel or form a precipitate as long as the pH is below 5.

EXAMPLE III

A 5 percent solution of sodiun silico-formate is slowly added to a 5 percent hydrochloric acid, while stirring, until the pH is 4.5. The temperature is kept between 30°–75° C. The sodium silico-formate is neutralized and a stable acidic aqueous solution of silico-formic acid is formed.

EXAMPLE IV

Silico-formic acid is added, while stirring, to a 10 percent sodium hydroxide solution which is heated to 50°–100° C. Silico-formic acid may be added to form up to a 30 percent solution of silico-formic acid in dilute sodium hydroxide.

A 10 percent solution of silico-formic acid in dilute sodium hydroxide is slowly added, while stirring, to 10 percent sulfuric acid, until the pH is 4.5. The temperature is kept between 30°–75° C, and the reaction takes place in 5–10 minutes. The sodium hydroxide is neutralized, and the silico-formic acid remains in solution. The solution is very stable and does not gel or precipitate as long as the pH is below 5.

EXAMPLE V

A 5 percent silico-formic acid in 2 percent sodium hydroxide aqueous solution is slowly added, while stirring, to a 20 percent acetic acid aqueous solution until the pH is 4.5. The temperature is kept between 30°–75° C, and the reaction takes place in 5–10 minutes. The sodium hydroxide is neutralized, and the silico-formic acid remains in solution. The solution is very stable as long as the pH is below 5.

EXAMPLE VI

Comparisons were made between aqueous solution of sodium silicate, sodium-formate, and silico-formic acid, in dilute sodium hydroxide, which was slowly added, to sulfuric acid, containing concentrations of 10, 20 and 40 percent, while stirring, until the solution had a pH of 4.5. The temperature was kept between 30°–75° C. The reactions were completed in 5–10 minutes.

| Results of the Above Chemical Reactions | | | |
|---|---|---|---|
| A) Using a 10% solution added to: | $H_2SO_4$ 10% | $H_2SO_4$ 20% | $H_2SO_4$ 40% |
| 1) 10% sodium silicate | gel | gel | gel |
| 2) 10% sodium silico-formate | solution | solution | gel |
| 3) 10% silico-formic acid in dilute NaOH | solution | solution | gel |
| B) Using a 5% solution added to: | $H_2SO_4$ 10% | $H_2SO_4$ 20% | $H_2SO_4$ 40% |
| 1) 5% sodium silicate | gel | gel | gel |
| 2) 5% sodium silico-formate | solution | solution | gel |
| 3) 5% silico-formic acid in dilute NaOH | solution | solution | gel |
| C) Using a 1% solution added to: | $H_2SO_4$ 10% | $H_2SO_4$ 20% | $H_2SO_4$ 40% |
| 1) 1% sodium silicate | gel | gel | gel |
| 2) 1% sodium silico-formate | solution | solution | solution |
| 3) 1% silico-formate in dilute NaOH | solution | solution | solution |

I claim:
1. The process for preparing an acidic solution of silico-formic acid by the following steps:
   a. Mixing 1 mol of silico-formic acid and from 0.4 to 1 mol of sodium hydroxide;
   b. Adding an amount of water to said mixture to produce a 1 to 10 percent solution by weight of sodium silico-formate;
   c. Heating said mixture to 50° to 100°C., while stirring for 1 to 3 minutes, or until the mixture goes into solution, thereby producing a sodium silico-formate solution;
   d. Adding said sodium silico-formate solution slowly, over a period of 5 to 20 minutes, to a dilute acid solution until the pH is 4.5, while stirring to keep the temperature between 30° and 75°C., thereby producing an acidic solution of silico-formic acid.

2. The method of claim 1, wherein the dilute acid is selected from a group consisting of a 5 to 40 percent aqueous solution by weight of sulfuric acid, 5 percent aqueous solution by weight of hydrochloric acid, and a 20 percent aqueous solution by weight of acetic acid.

3. The method of claim 1, wherein the dilute acid is a 5 to 40 percent aqueous solution by weight of sulfuric acid.

4. The method of claim 1, wherein the dilute acid is a 5 percent aqueous solution by weight of hydrochloric acid.

5. The method of claim 1, wherein the dilute acid is a 20 percent aqueous solution by weight of acetic acid.

* * * * *